Feb. 21, 1939. R. A. WAIT 2,148,142
PROCESS OF DEBITTERIZING SOY BEANS
Filed Feb. 12, 1937
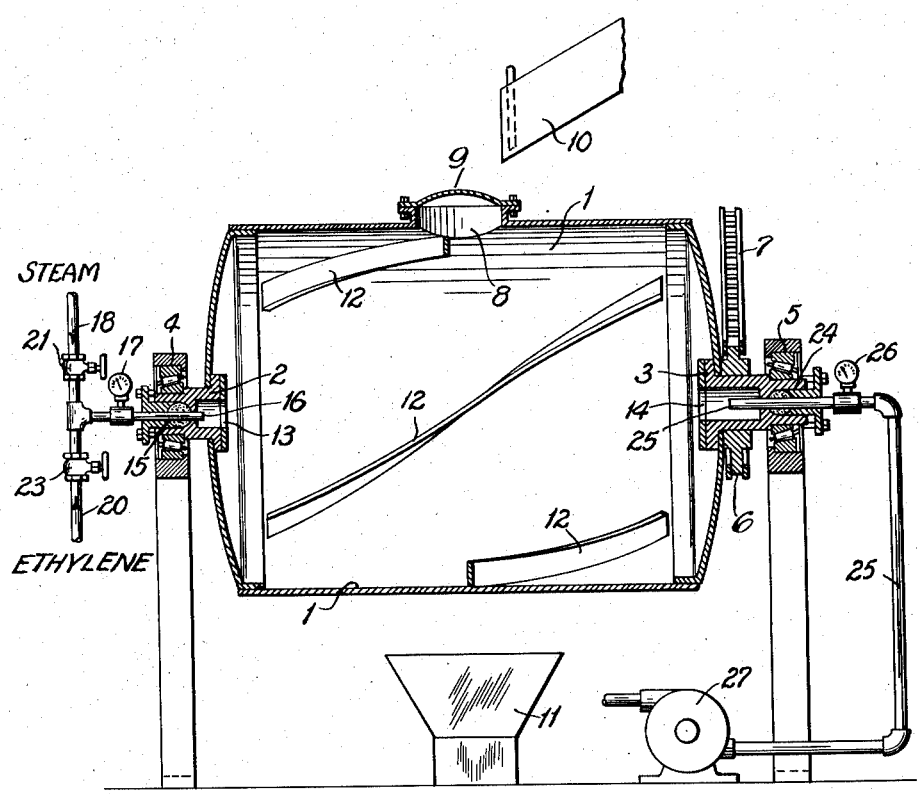
Robert A. Wait,
Inventor,
Delos G. Haynes,
Attorney.

Patented Feb. 21, 1939

2,148,142

UNITED STATES PATENT OFFICE 2,148,142

PROCESS OF DEBITTERIZING SOY BEANS

Robert A. Wait, Decatur, Ill., assignor, by mesne assignments, to Spencer Kellogg & Sons, Inc., Buffalo, N. Y., a corporation of New York Application February 12, 1937, Serial No. 125,442

2 Claims. (Cl. 99—98)

This invention relates to the debitterizing of natural soy beans, and, with regard to certain more specific features, to the debitterizing of natural soy beans for the manufacture of soy bean flour or other soy bean products of improved food value.

This invention is an improvement over the process described and claimed in William L. Shellabarger Patent 1,867,541, dated July 12, 1932.

Among the several objects of the invention may be noted the provision of a method of treating natural soy beans to remove the naturally present objectionable oils and flavors, so that the resulting treated beans are capable of manufacture into soy bean products, such as flour, which is clear, sweet, and devoid of objectionable flavors and odors; the provision of a method of treating natural soy beans of the class described, in which steps are taken to prevent the development of rancidity in the fat or oil constituent of the soy beans; and the provision of a process of the class described which is simple and economical. Other objects will be in part obvious and in part pointed out hereinafter.

The invention accordingly comprises the steps and sequence of steps, and features of synthesis, which will be exemplified in the processes hereinafter described, and the scope of the application of which will be indicated in the following claims.

The accompanying drawing is a diagrammatic view of a portion of the apparatus used in the invention.

In the aforesaid Shellabarger Patent 1,867,541, a highly satisfactory method is described for removing the objectionable odors and flavors from natural soy beans, prior to processing said beans into soy bean flour or other soy bean products. Broadly, the process there described comprises subjecting the beans to a steam treatment at temperatures below 212° F., so as to avoid insolubilization of the albuminoids present in the natural beans. After the steam treatment, in the said patented process, the beans are cooled, preferably in the presence of carbon dioxide gas for the purpose of decreasing the tendency of the beans to undergo oxidation, which oxidation tends to promote rancidification of the natural fats and oils in the beans.

It has been found that the treatment with carbon dioxide described in the aforesaid Shellabarger patent is in some respects subject to improvement, because it does not invariably succeed in preventing the commencement of rancidification. It is not to be understood that the method of the aforesaid Shellabarger patent is inoperative in this respect, because, in a large proportion of cases, the described carbon dioxide treatment is sufficient to prevent the commencement of any rancidification in serious proportions. However, it is of course advisable that the commencement of rancidification be prevented in all instances, and the present invention succeeds in that object whereas the process of the aforesaid Shellabarger patent does not.

Referring to the drawing, numeral 1 indicates a rotary drum or retort, supported by its endheaders 2 and 3 in bearings 4 and 5 respectively. A gear 6, driven as by a chain belt 7, is provided for rotating the drum. A charging and discharging opening 8, simulating a man-hole, is provided in one side of the drum. The opening 8, during operation, is closed by a cover 9. A charging spout 10 and discharge hopper 11 are desirably provided, although not essential. Vanes or distributors 12 are desirably provided on the inner walls of the drum 1 to maintain the contents in agitation during treatment. The headers 2 and 3 are provided with screened openings 13 and 14, preventing clogging thereof with beans.

The header 2 comprises the inlet end of the drum 1. Secured in a gas-tight manner by a stuffing gland 15 is a gas inlet pipe 16. The pipe 16 has a pressure gauge 17 thereon, and connects with a steam supply pipe 18 and a gas supply pipe 20. Pipes 18 and 20 are provided with suitable valves 21 and 23, respectively.

The header 3 comprises the outlet end of the drum 1, and is provided with a stuffing gland 24 securing an outlet pipe 25 in gas-tight manner. The pipe 25 is provided with a pressure gauge 26, and connects ultimately with a vacuum pump 27, which discharges into the atmosphere or elsewhere.

The operation of the device is as follows:

Cold, natural soy beans are introduced into the drum 1, until said drum is about one-fourth or one-third full. The cover 9 is then secured on the opening 8, and rotation of the drum is commenced. The valves 21 and 23 are closed, and the vacuum pump 27 operated until the interior of the drum shows a vacuum of the order of 24 inches, more or less, as the case may be. This has (by vapor tension laws) some drying effect upon the beans, although such is not large as the beans are still quite cool.

The next step of the procedure comprises bringing the temperature of the beans up to the order of the temperature at which it is desired to steam them. This is desirably achieved, according to the present invention, by opening the valve 23 and flowing preheated ethylene, or a mixture of ethylene and an inert gas or gases, through the drum. The ethylene may be, and ordinarily preferably is mixed with a diluting inert gas, such as carbon dioxide, nitrogen, or the like. The inert gas is inert in the sense that it neither promotes nor retards oxidation or reduction reactions. Steam may be added to either the ethylene, or to the ethylene-inert gas mixture, to facilitate the preheating.

The ethylene probably combines with the objectionably tasting substances of the soy beans, to form a volatile substance in situ in the beans. This volatile substance is readily removed from the mass of beans by the gases which are now flowing and which later flow through the drum in the course of treatment. The elimination of these offensive substances leaves the beans with their original chemical composition except for the removal of the offensive constituents.

The preheating with ethylene is preferably continued until the beans are at a temperature slightly above the steaming temperature, condensation upon the admission of the steam being thus minimized.

Still holding the vacuum at, for example, slightly more than 24 inches, valve 23 is partially closed and valve 21 is open to admit steam to the rotating drum. The steam is preferably slightly superheated; that is, for example, its temperature, in the given vacuum, is around 140° F., as contrasted to a saturated steam temperature of 139° F. at the same given vacuum. Maintenance of the 24 inch vacuum keeps the temperature at or below about 140° F., and insolubilization is thus inhibited.

Even during the steaming of the beans, it is desirable that the valve 23 be left partially open, in order that a small amount of ethylene may flow into the drum 1 along with the steam.

The steaming is continued until the undesirable odors and flavors of the raw beans are eliminated. The total time of steaming depends largely upon the temperature, the characteristics of the particular beans being treated, and other factors peculiar to the instant case. In general, forty minutes is a base time from which to vary to suit the particular conditions.

When the beans are sweet and free of undesirable odor, the steam flow is discontinued by closing valve 21 and valve 23 is opened again to admit a full flow of ethylene, or mixture of ethylene and inert gases, to the drum. Accurate maintenance of the 24 inch vacuum is no longer necessary, although it is desirable to maintain some vacuum in order to facilitate drying.

The use of ethylene at this stage of the procedure has been found to be particularly advantageous, as, during this period of cooling of the beans, the tendency for them to undergo reactions which promote rancidification is particularly noted.

The flow of ethylene solely cools the beans and at the same time dries them, at least partially. Under some conditions, it is desirable that the ethylene be preheated to a temperature slightly less than that of the beans, and then the temperature of the ethylene progressively decreased to lengthen the cooling period. Such a procedure facilitates drying of the beans.

Flow of the ethylene is continued until the beans have been cooled approximately to room temperature. The rotation of the drum is then stopped with the opening 8 above the discharge hopper 11, and the closure 9 is removed, thus permitting the processed beans to discharge into the hopper 11.

From the hopper, the processed beans are taken through the customary degermination, husking, oil-expressing, and milling operations. The soy oil obtained (preferably by pressure-expression, rather than by solvent extraction) is characterized by its clearness and freedom from objectionable odors and flavors, and is edible without further refining.

The flour obtained as the end product is whiter than similar flours heretofore manufactured, probably because of either a direct bleaching action exerted by the ethylene, or because the dark products of oxidation of the beans heretofore encountered are not present, or for both reasons. No insoluble matter has been produced by the processing, and the flour accordingly exhibits all the nutritive values of the natural beans in readily digestible form, albeit deodorized and deprived of distasteful flavors.

Beans debitterized by the process of the present invention are of course useful for the production of edible soy bean products other than flour, for example, soy bean cake, grits, flakes, and the like.

Throughout this exemplary description, the temperature value for treatment has been recited as 140° F. It is to be understood, however, that beneficial results are achieved even though the temperature be somewhat more or less than that value. For instance, the insolubilization occurring at 190° F. is relatively less than that at 212° F. or higher, and, to that extent, 190° F. (and the vacuum corresponding) is advantageous. Also, temperatures less than 140° F. may advantageously be used, both because of the peculiar characteristics of the beans under treatment and to provide a factor of safety of 20°, more or less, thus insuring the noninsolubilization phenomena.

From the foregoing description, it will be seen that the beans have been maintained in an ethylene atmosphere throughout the whole period of their treatment. Because of this ethylene atmosphere, all appreciable oxidation of the beans or any constituent thereof is prevented, and thereby rancidity is avoided. It is believed that through this treatment in a reducing atmosphere, the so-called induction period (in which practically all rancidity in fats begins) is completely avoided, and that for that reason the processed beans may be safely made into other soy bean products such as flour, meal, and grits, without the danger of development of off-flavors due to partial oxidation stimulated during and after the processing treatment, which rancidity might otherwise develop because of this induction period in the processing drum. Induction periods, it will be understood, are the times in oxidation reaction which provide the momentum (chemically speaking) to promote a more and more rapid oxidation or rancidification as exposure is continued. If the induction period can be avoided, rancidity is very slow to start, and often can be entirely avoided.

In view of the above, it will be seen that the several objects of the invention are achieved and other advantageous results attained.

As many changes could be made in carrying out the above processes without departing from the scope of the invention, it is intended that all matter contained in the above description or shown in the accompanying drawing shall be interpreted as illustrative and not in a limiting sense.

I claim:

1. The process of treating natural soy beans to remove objectionable odors and flavors therefrom, which comprises subjecting said beans in their natural state to the action of steam at elevated temperatures, while maintaining said beans in an atmosphere containing ethylene.

2. The process of improving the odor and flavor of natural soy beans which comprises placing said beans in their natural state in a closed container, drawing a vacuum on the said container, preheating said beans by flowing thereover a relatively warmer gas comprising a mixture of ethylene and an inert gas, subjecting the preheated beans to a steam treatment with steam to which has been added a portion of said gas, and thereafter cooling said beans with said gas at progressively lower temperatures, and finally discharging the beans from the said closed container.

ROBERT A. WAIT.